United States Patent
Menjak et al.

(10) Patent No.: US 7,455,321 B2
(45) Date of Patent: Nov. 25, 2008

(54) COLLAPSIBLE STEERING COLUMN ASSEMBLY

(75) Inventors: Ratko Menjak, Frankenmuth, MI (US); Karen A. Boswell, Freeland, MI (US); Sainan Feng, Saginaw, MI (US); James P. Kelly, Saginaw, MI (US); Brian J. Magnus, Frankenmuth, MI (US); Wayne M. Steverson, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/709,632

(22) Filed: Feb. 22, 2007

(65) Prior Publication Data
US 2007/0194563 A1  Aug. 23, 2007

Related U.S. Application Data

(60) Provisional application No. 60/776,042, filed on Feb. 23, 2006.

(51) Int. Cl.
*B62D 1/00* (2006.01)
(52) U.S. Cl. .................................... 280/777
(58) Field of Classification Search ............ 280/777; 74/492, 493; 188/371
See application file for complete search history.

(56) References Cited

U.S. PATENT DOCUMENTS

| | | | | |
|---|---|---|---|---|
| 5,052,716 A | * | 10/1991 | Matsumoto | 280/777 |
| 5,209,135 A | * | 5/1993 | Ichikawa | 74/492 |
| 5,425,553 A | * | 6/1995 | Yazane et al. | 280/777 |
| 5,547,221 A | * | 8/1996 | Tomaru et al. | 280/777 |
| 6,224,104 B1 | * | 5/2001 | Hibino | 280/777 |
| 6,749,222 B2 | | 6/2004 | Manwaring et al. | |
| 7,188,867 B2 | * | 3/2007 | Gatti et al. | 280/777 |
| 7,219,927 B2 | * | 5/2007 | Lee | 280/777 |

* cited by examiner

*Primary Examiner*—Kevin Hurley
*Assistant Examiner*—Robert A. Coker
(74) *Attorney, Agent, or Firm*—Michael D. Smith

(57) ABSTRACT

A collapsible steering column assembly preferably has a collapsible steering shaft that extends rotatably along a centerline and a collapsible column that houses and co-extends with the shaft. The column preferably has inner and outer jackets that retract axially to collapse the column. An energy absorbing device has a member engaged between the inner and outer jackets and controls the collapse of the column generally via a high load stage and a low load stage of operation. The member is preferably elongated axially having a distal end that is looped over and spaced radially outward from the remainder of the member. The distal end is attached disengagably to the outer jacket via a pin received in a hole in the distal end and a fuse engaged operably to the pin and attached to the outer jacket.

14 Claims, 6 Drawing Sheets

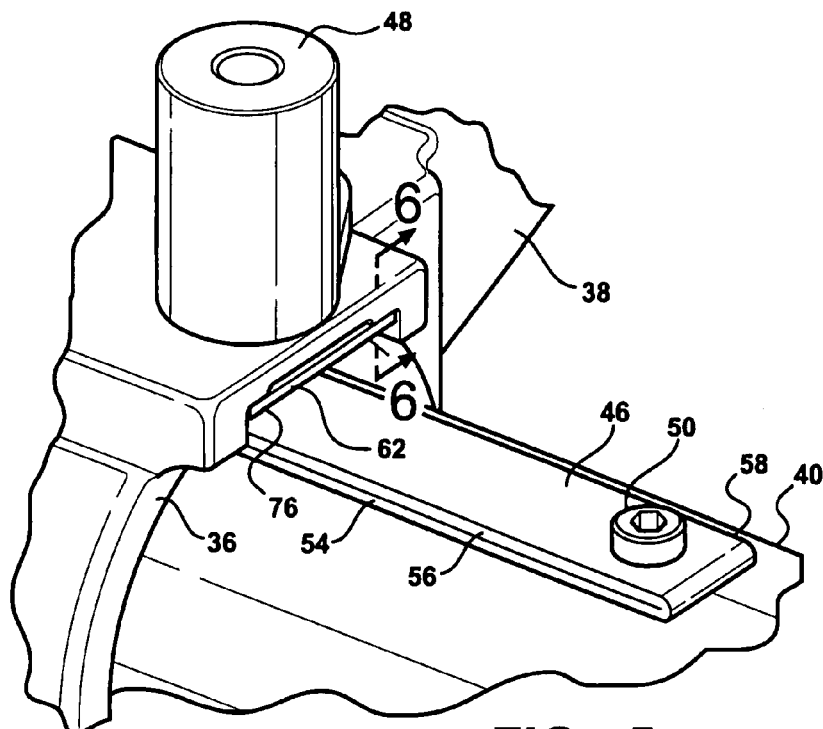
FIG - 5
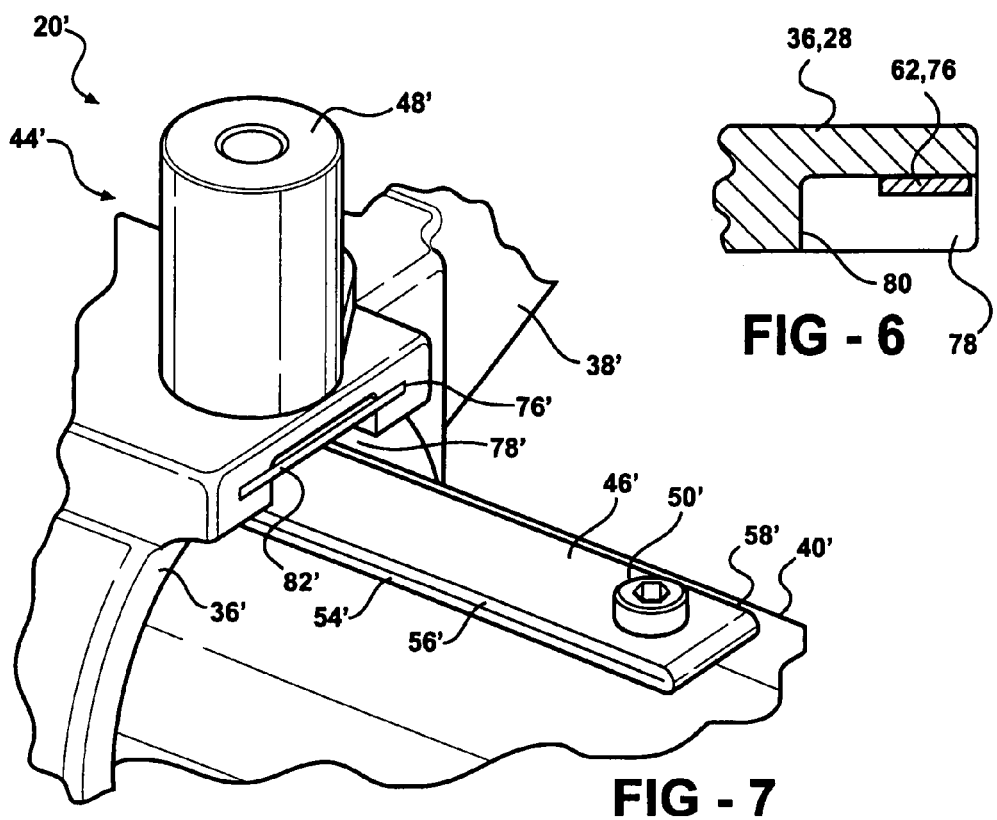
FIG - 6
FIG - 7

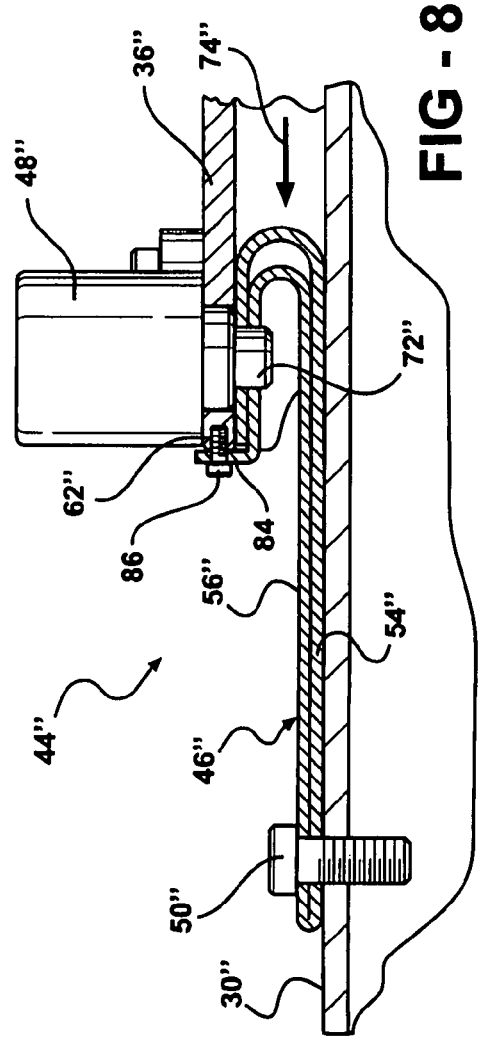
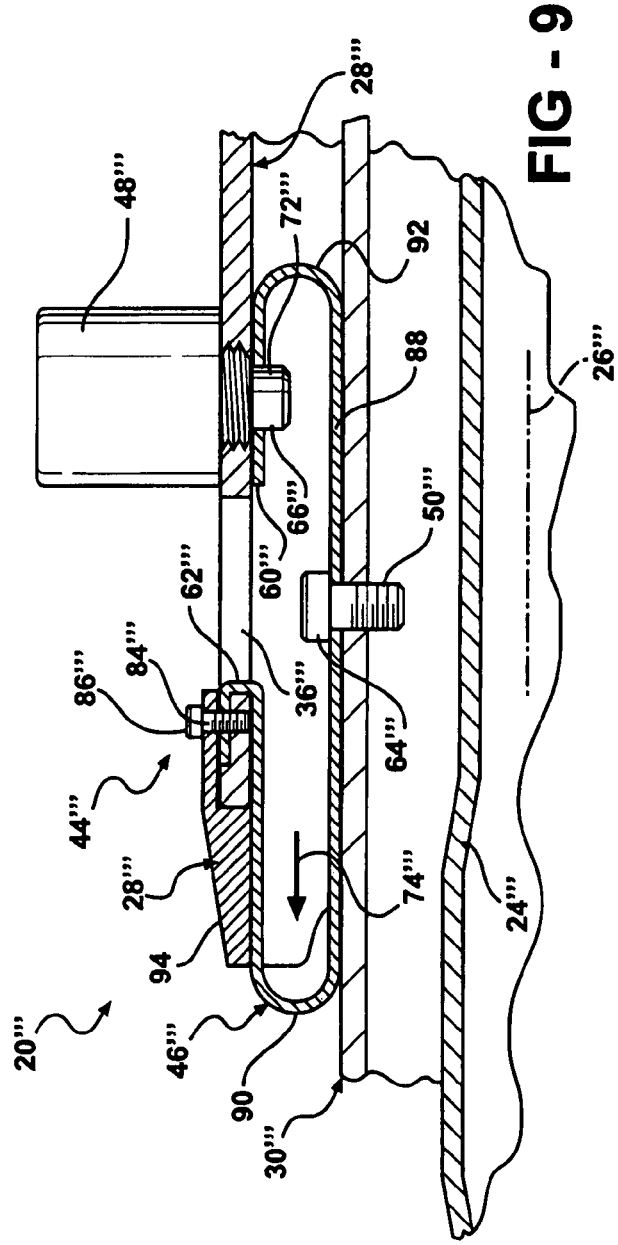

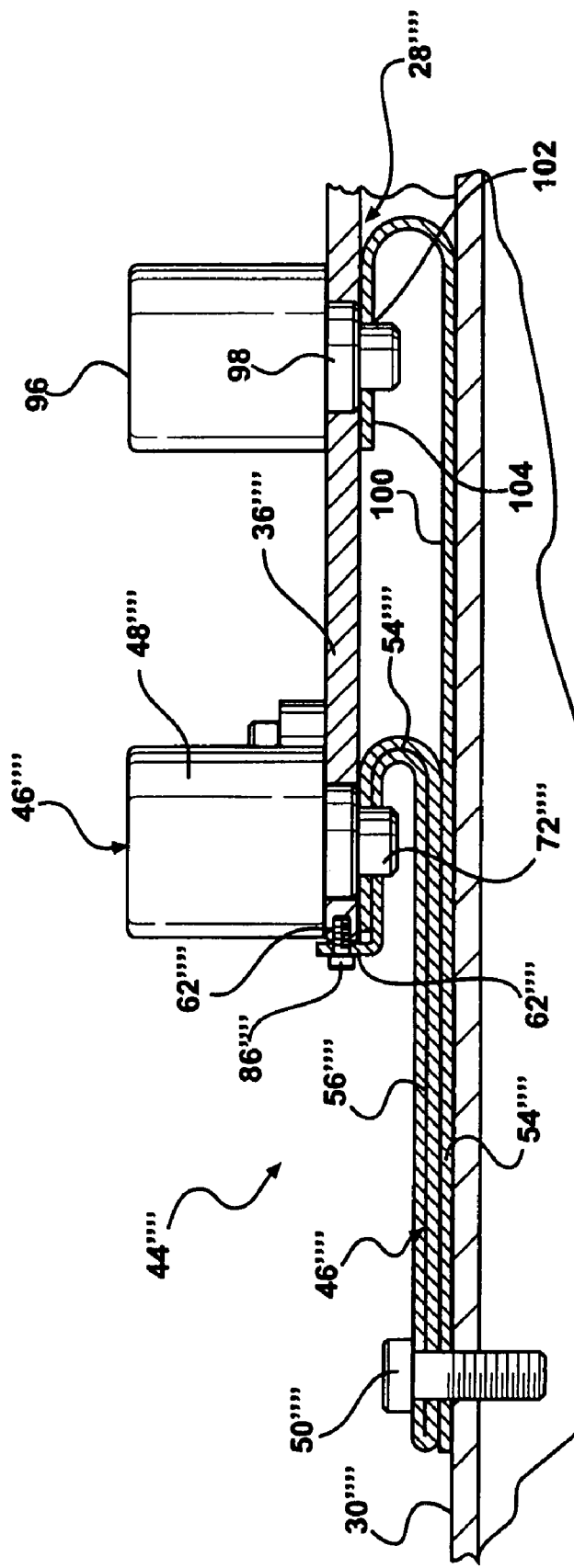

COLLAPSIBLE STEERING COLUMN ASSEMBLY

CROSS-REFERENCE TO RELATED APPLICATIONS

The present application claims priority and all advantages of U.S. Provisional Patent Application Ser. No. 60/776,042 filed on Feb. 23, 2006, and is incorporated herein in its entirety.

BACKGROUND OF THE INVENTION

1. Field of the Invention

This application relates generally to steering columns, and more particularly to adaptive energy absorbing devices for collapsible steering columns.

2. Description of Related Art

Automotive steering columns are typically equipped with kinetic energy absorption devices to reduce injury of a vehicle operator in the event of a collision that may cause the operator to impact the steering wheel. Such impacts during vehicle collision typically cause the steering column to collapse thereby absorbing energy that may otherwise be transmitted to the operator.

Such energy absorbing steering columns generally include a housing that translates linearly through a collapse stroke during a collision. A force generated by the driver from an impact with the steering wheel initiates the collapse stroke. The steering wheel housing moves against a resisting or reactive force that may be produced by an energy absorber designed to convert a portion of the driver's kinetic energy into work. The resisting force may be generated utilizing systems currently known in the art, including the plastic deformation of a metal element that is a part of an energy absorbing device.

Such energy absorbing (E/A) devices presently have fixed energy absorption capabilities, and offer no control over their performance during the collapse stroke. Typically, the resisting force against which the column is stroked is provided by plastic deformation of a metal element which comprises a part of the E/A system.

Generally, traditional energy absorbing devices have a fixed energy absorbing curve which is optimized to protect a given group of drivers, in most cases represented by an average size male driver. To better protect other groups of drivers not belonging to the average male driver group, such as smaller female drivers or large drivers, an adjustable energy absorbing device is needed in the art. It is also desirable for E/A devices to have performance characteristics that can vary upon factors other than driver size, such as his or her position and the speed of vehicle.

It is, therefore, desirable for an energy absorbing device to be adjustable based upon a given driver size and his position, as well as include variables for the severity of the collision. It is also desirable to use an energy absorbing device that is capable of adjusting in a time frame similar to that of an airbag system. Therefore, to account for the severity of the collision, and act at the same time as an airbag, an energy absorbing device should be capable of adjustment within a few milliseconds of time such that a given load curve can be utilized by the device based on the severity of the collision and the characteristics of the driver.

There is, therefore, a need in the art for an active energy absorbing device that is capable of automatically adjusting performance characteristics to account for the severity of a collision, as well as the characteristics of the driver; and to do so within a workable time span (i.e. a few milliseconds) and similar to that of an airbag deployment.

SUMMARY OF THE INVENTION

A collapsible steering column assembly preferably has a collapsible steering shaft that extends rotatably along a centerline and a collapsible column that houses and co-extends with the shaft. The column preferably has inner and outer tubes that retract telescopically when the column collapses. An energy absorbing (E/A) device has a member that preferably is a strap engaged between the inner and outer tubes and controls the collapse of the column generally via a high load stage and a low load stage of operation. The member is preferably elongated axially having a distal end that is looped over and spaced radially outward from the remainder of the member. The distal end is disengagably attached to the outer tube via a pin received in a hole in the distal end and a fuse engaged operably to the pin and attached to the outer tube.

The E/A device preferably exerts a variable resistance along collapse stroke of the column. In one embodiment of the present invention, the E/A device variably accommodates: low load stage for use with, e.g., a smaller driver, lower speed of vehicle, and/or the driver being belted; the high load stage is preferably for use with, e.g., a heavier driver, high speed of vehicle, and/or the driver being unbelted driver. Such an embodiment may include one plastically-deformable strap with two stages. Another embodiment of the present invention provides a three stage E/A device accommodating minimum, middle and maximum loads or E/A capabilities. In either the two or three-stage embodiments, which stage to be appropriately applied will depend on selective activation of one or more of the fuses, that are preferably of a pyrotechnic type, in response to conditions determined from sensors measuring: vehicle speed, weight of driver, seat position and belt function.

The present invention provides the ability to match E/A to load curves of different shapes during collapse of the column. The present invention achieves this result, in either of the two abovementioned embodiemnts with a single, one piece strap that deforms without friction to ensure a stable E/A process with maximum simplicity and low cost.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 5 is an enlarged partial perspective view of the steering column assembly;

FIG. 6 is a partial cross section of the assembly taken along line 6-6 of FIG. 5;

FIG. 7 is a partial perspective view of a second embodiment of a steering column assembly and similar in perspective to FIG. 5;

FIG. 8 is a partial cross section of a third embodiment of a steering column assembly and similar in perspective to FIG. 2;

FIG. 9 is a partial cross section of a fourth embodiment of a steering column assembly; and FIG. 10 is a partial cross section of a fifth embodiment of a steering column assembly.

Figure 1:
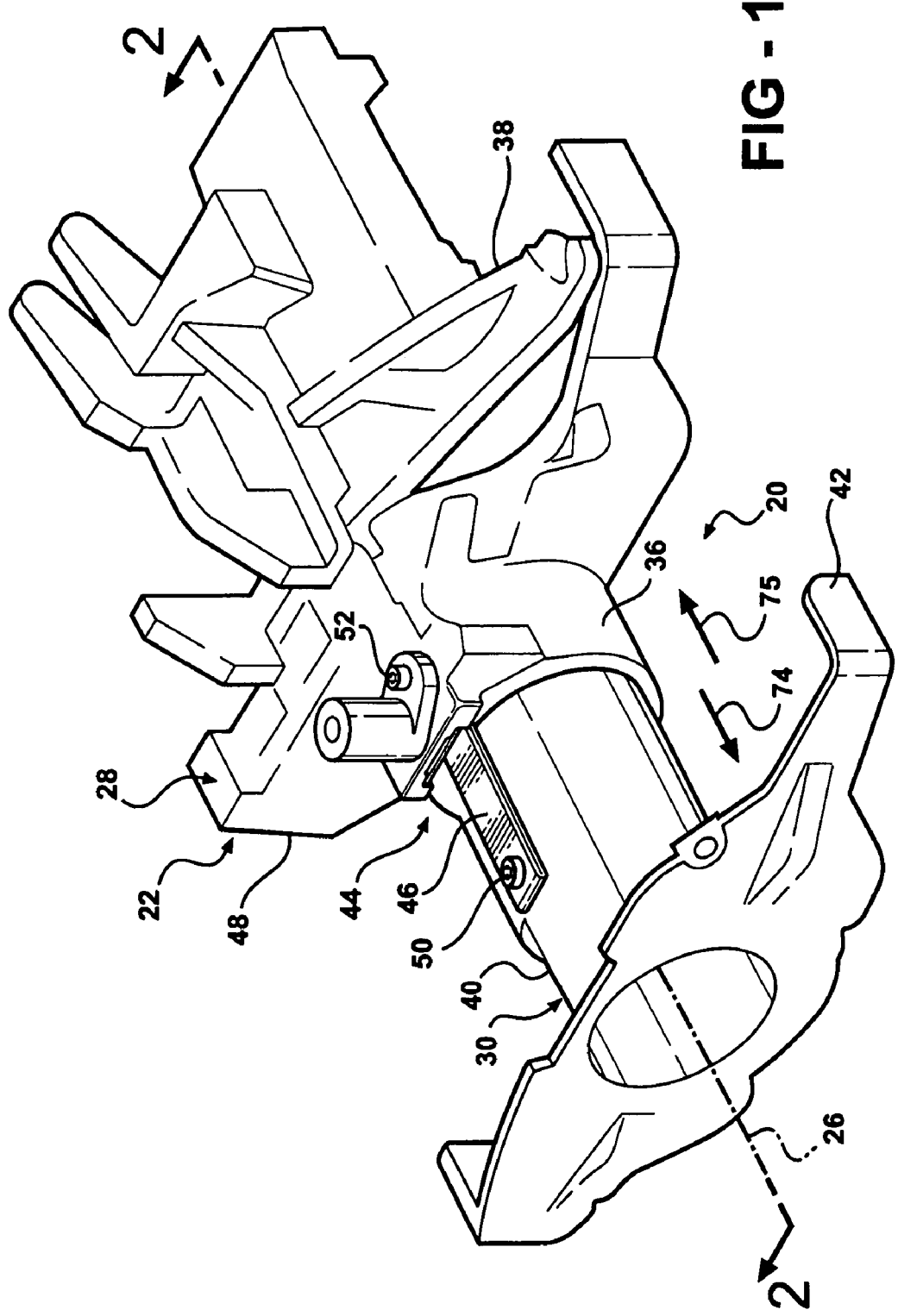
FIG. 1 is a perspective view of a steering column assembly of the present invention illustrated with a two-stage E/A device and without a collapsible steering shaft of the assembly to show internal detail.

Corresponding reference characters indicate corresponding parts throughout the several views. Although the drawings represent embodiments of the present invention, the drawings are not necessarily to scale and certain features may be exaggerated or simplified in order to better illustrate and explain the present invention. The exemplifications set out herein illustrate embodiments of the invention in several forms, and such exemplifications are not to be construed as limiting the scope of the invention in any manner.

DETAILED DESCRIPTION OF THE INVENTION

Figure 2:
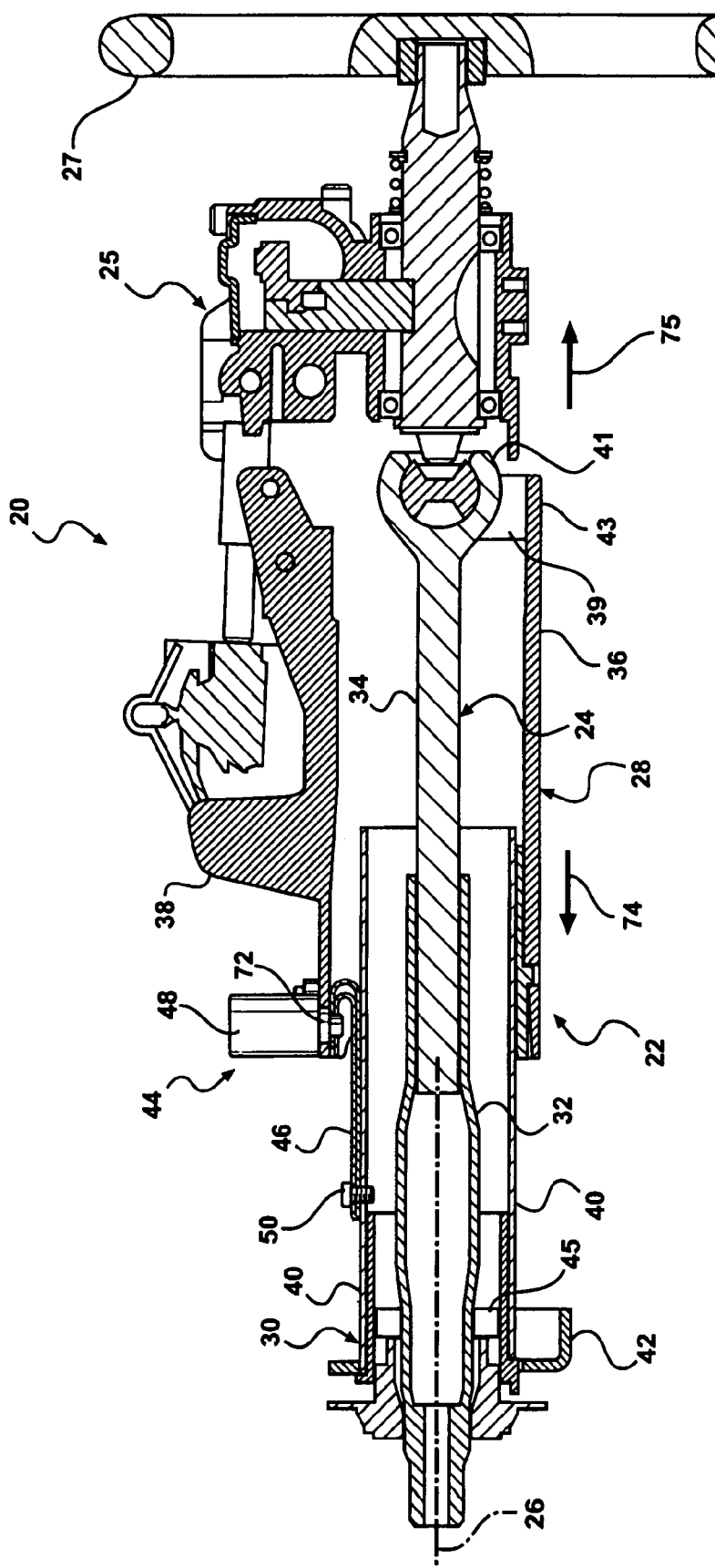
FIG. 2 is a cross section of the steering column assembly taken along line 2-2 of FIG. 1 and with the collapsible steering shaft.
Figure 3:
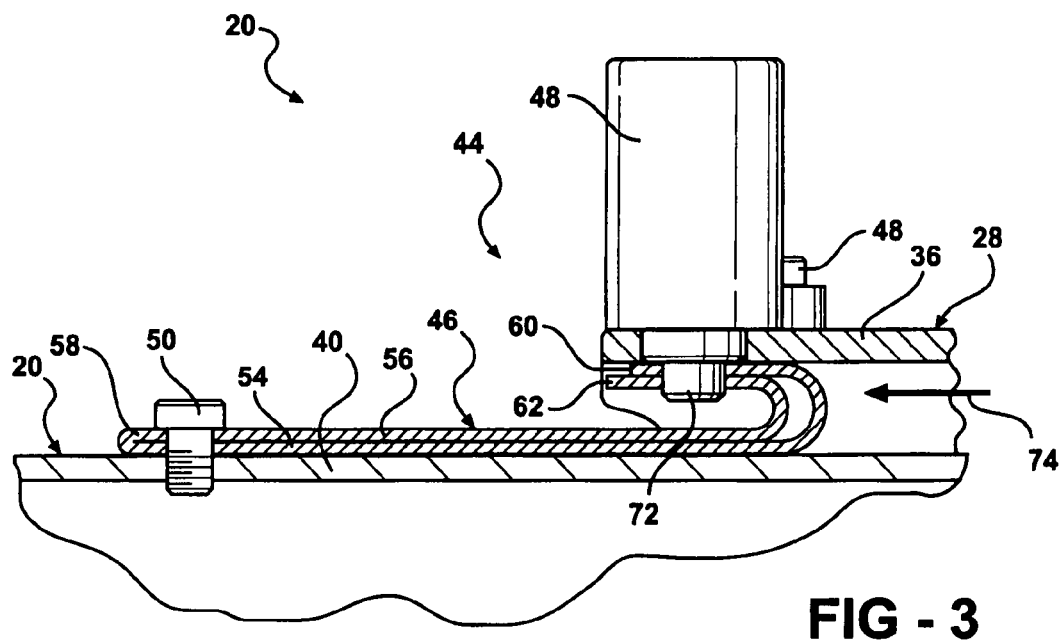
FIG. 3 is an enlarged partial side view of the steering column assembly.

Referring to FIGS. 1-2, a steering column assembly 20 exemplifying the present invention includes an outer longitudinally collapsible column 22, a telescopically collapsible steering shaft 24 and preferably a steering wheel tilt mechanism 25 engaged to a steering wheel 27. The column 22 and the shaft 24 extend longitudinally along a centerline 26 with the shaft 24 located radially inward from and generally concentric to the column 22. The collapsible column 22 has a radially outer jacket 28, and a radially inner jacket 30. The collapsible steering shaft 24 of the assembly 20 has forward and rearward portions 32, 34 engaged telescopically to one-another and generally extending through the jackets 28, 30. The forward portion 32 projects outward from the inner jacket 30 and in a forward direction 74, with respect to the vehicle, and the rearward portion 34 projects in a rearward direction 75 for pivotal engagement to the tilt mechanism and thus engagement to the steering wheel 27.

Preferably, the outer jacket 28 is a unitary casting that integrates an outer tube or tubular portion 36 for receipt of the shaft 24 and a bracket portion 38 for releasable engagement to a vehicle chassis and generally tilt-and-lock engagement to the tilt mechanism 25. The bracket portion 38 of outer jacket 28 preferably secures to the vehicle structure through capsules (not shown) fitted into the bracket portion 38 and designed to break away therefrom during column collapse. The tubular portion 36 preferable carries a journal or socket 39 for substantially frictionless support of a universal joint 41 at a rearward end 43 of the shaft portion 34 that generally engages the preferably tiltable steering wheel 27. The journal, and as known in the art, is constructed and arranged to permit substantially frictionless rotation of the shaft 24 with respect to tubular portion 36 while preferably allowing axial movement between the tubular portion 36 and the shaft portion 34 during collapse of the steering shaft 24. One skilled in the art would now know, however, that the column 22 may collapse simultaneously with the steering shaft 24 thus axial movement between the shaft portion 34 and the tubular portion 36 may not be necessary.

The inner jacket 30 preferably has an inner tube or tubular portion 40 and a stamped bracket portion 42 preferably welded rigidly to a distal end of the tubular portion 40. The stamped bracket portion 42 engages rigidly, and without release, to the vehicle chassis. The tubular portion 40 preferably carries a bearing ring 45 for substantially frictionless rotation of the steering shaft 24 located therein. Unlike the journal carried by the outer jacket 28, the bearing ring 45 carried by the inner jacket 30 does not generally permit axial movement between the inner jacket 30 and the rearward portion 32 of shaft 24 during shaft collapse.

Preferably, the shaft portions 32, 34 are configured to one another along the centerline 26 to allow limited longitudinal or axial movement there-between for adjustment of steering wheel position. Whether the steering wheel position is adjustable or not during normal operation, the shaft portions 32, 34 are preferably constructed and arranged to collapse telescopically during a vehicle collision. During normal operation of the vehicle the column 22 is generally rigid. However, during a collision the rearward portion 34 of steering shaft 24 moves in a substantially forward direction and telescopically into the forward portion 32. During this movement, the shaft portion 34 also moves axially with respect to jacket 28 that may remain secured to the vehicle chassis.

With the steering shaft 24 collapsed, and with continued forward momentum of the vehicle operator, the outer jacket 28 generally breaks away from the vehicle chassis and an energy absorption (E/A) device 44 begins to convert the remaining kinetic energy into work. With the E/A device 44 generally activated, the column 22 collapses via telescopic or axial movement between the outer jacket 28 and the stationary inner jacket 30 that remains secured to the vehicle chassis.

Referring to FIGS. 1-4, the E/A device 44 of the assembly 20 longitudinally and steadfastly fixes the outer jacket 28 to the inner jacket 30 during normal vehicle operation. The E/A device 44 is operatively positioned radially between the tubular portion 40 of the inner jacket 30 and the tubular portion 36 of the outer jacket 28 and with respect to centerline 26. E/A device 44 of column assembly 20 includes a member or strap 46, preferably of a two stage type, and a bi-state pyrotechnic device or fuse 48, respectively secured through bolts 50 and 52 to inner jacket 30 and outer jacket 28, respectively. Pyrotechnic devices such as fuse 48, and the sensed conditions and logic for selectively firing them, are well known in the art, and may, for example, be as generally described in U.S. Pat. No. 6,749,222, which is incorporated herein by reference in its entirety.

Figure 4:
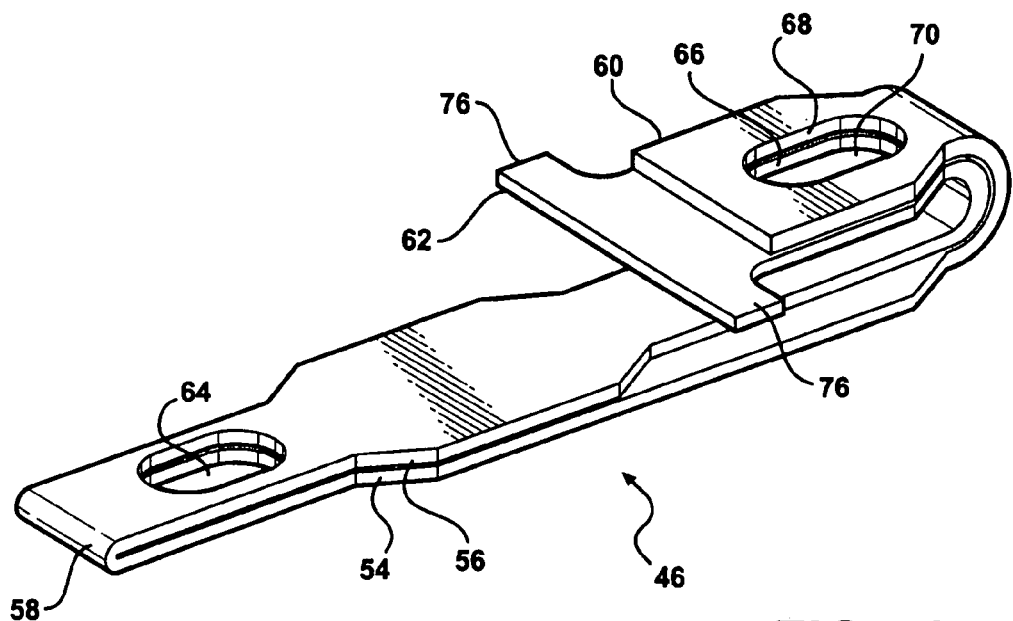
FIG. 4 is a perspective view of a strap of the E/A device.

Referring to FIG. 4, strap 46 of the E/A device 44 is formed from a single strip of a plastically-deformable material such as steel, that is folded over upon itself forming first and second portions or material layers 54 and 56, folded end 58 that joins layers 54 and 56, and material free ends 60 and 62. The width of layer 54 preferably differs along its length from the width of layer 56 for creating the two stage energy absorption capability that generally matches two different load curves during collapse of column 22. As described further below, in one of the two energy absorption stages (the first or higher load stage), both material layers 54 and 56 are stressed and deformed; in the other of the two stages (the second or lower load stage), only one of the layers is stressed and deformed, thus the energy absorption during column collapse is varied.

Referring to FIGS. 1-4, bolt 50 extends through a hole 64 in strap 46 near the folded end 58 to secure strap 46 to portion 40 of inner jacket 30. A second hole 66 in strap 46 is defined by continuous inner edges 68, 70 carried respectively by layers 54, 56. The hole 66 is located near the material free ends 60, 62 and receives a pin 72 of the fuse 48 for generally securing the layer 54 of strap 46 to the tubular portion 36 of the outer jacket 28. In the high load stage of the E/A device 44, the engagement of pin 72 of the unfired pyrotechnic fuse 48 with the continuous inner edges 68, 70 of respective layers 54, 56 within hole 66 preferably causes both layers 54, 56 to be stressed and deformed during column collapse. That is, as outer jacket 28 breaks from the vehicle chassis and shifts axially forward (with respect to the vehicle) in the direction of arrow 74 (see FIG. 3) and along the centerline 26, jacket 28 further envelopes stationary inner jacket 30 causing plastic deformation of both layers 54, 56.

A variety of sensors (not shown) are responsive to certain sensed conditions relating to driver weight, seat position, whether the driver is belted, and/or vehicle speed. When a pre-specified condition is sensed, the sensor sends an electric signal to the fuse 48 of the E/A device 44 that generally initiates the low load stage of device 44 operation. Upon receipt of the electric signal coupled with a collision event, the fuse 48 fires thereby removing pin 72 from hole 66 just prior to column collapse. Referring now to FIGS. 4-6, strap material free end 62 has two integrally-formed tabs 76 extending in opposite lateral directions. The tabs 76 are seated in a recess 78 generally in portion 36 of outer jacket 28. Recess 78 is partially defined by a pair of shoulders or stops 80 formed in and preferably carried by portion 36 of outer jacket 28. Each stop 80 abuts a respective tab 76 during column collapse. During an activation of the lower load stage of E/A device 44, where the fuse 48 has removed the pin 72, when the outer jacket 28 is loaded and moves in the direction of arrow 74 (see FIG. 3) the stops 80 push the tabs 76 of the distal end 62 of layer 56 in the axial direction 74, thereby deforming layer 56. The end 60 of layer 54 is generally free, does not deform, and generally stays stationary with the inner jacket 30. This configuration places layer 56 under stress causing deformation, while layer 54 is not stressed and thus does not deform. For the first embodiment of assembly 20, the recess 78 may be completely open towards inner jacket 30 (as best shown in FIGS. 5 and 6) with strap tabs 76 merely disposed therein. At the beginning of column collapse, stops 80 preferably move freely a short axial distance before picking up the load from layer 56.

Alternatively and as shown in FIG. 7, a second embodiment of the assembly is illustrated wherein like components have the same identifying numerals except with the addition of a single prime symbol. For E/A device 44', strap tabs 76' may be slidably received in slots 82 formed on opposite lateral sides of recess 78'. Each slot 82 is defined in part by a blind end (not shown) that forms shoulders 80' against which tabs 76' abut during collapse of column assembly 20'.

Referring to FIG. 8, a third embodiment of the assembly is illustrated wherein like components have the same identifying numerals except with the addition of a double prime symbol. For E/A device 44" a hole 84 in the strap 46" near a material free end 62" of strap 46" receives a bolt 86 for securing the free end 62" to portion 36" of an outer jacket 28". With pin 72" retracted and released from strap 46" (not shown) during the lower load stage of the E/A device 44", free end 60" remains stationary with inner jacket 30" while the end 62" of layer 56" moves generally with the portion 36" in a direction indicated by arrow 74". Only the material layer 56" is stressed and deformed during the lower load stage.

Referring to FIG. 9, a fourth embodiment of the assembly is illustrated wherein like components have the same identifying numerals except with the addition of a triple prime symbol. An E/A device 44''' of column assembly 20''' includes a strap 46''' formed from a single strip of a plastically-deformable material such as steel. The strap 46''' has opposite end portions 60''', 62''' that are folded over a central portion 88 of the strap 46''', thus forming a substantially oval-shape or loop that is partially opened upward (as illustrated in FIG. 8 but not necessarily) between the spaced apart end portions 60''', 62'''. A hole 64''' in the central portion 88 of strap 46''' aligns to a threaded hole in the inner jacket 30''', for receipt of a threaded bolt 50''' thus securing the central portion 88 to the inner jacket 30'''. A hole 66''' in end portion 60''' receives a pin 72''' of a pyrotechnic fuse 48'''. A hole 84''' in end portion 62''' receives a bolt 86''' for securing the end portion 62''' of strap 46''' to the portion 36''' of outer jacket 28'''. The central portion 88 of strap 46''' is connected via large-radius bends 90 and 92 to the respective end portions 60''', 62''' that are disposed substantially parallel with strap central portion 88.

A restraining support 94, which is shown as being attached to portion 36''' of outer jacket 28, but which may instead be integral therewith, maintains a substantial overhead segment of end portion 62''' in parallel with strap central portion 88. A substantial overhead segment of end portion 60''' is likewise confined by a radially inward facing surface of portion 36''' to maintain the parallel relationship with strap central portion 88.

During column 22''' collapse with E/A device 44''' in a high load stage, fuse pin 72''' remains in the hole 66''' and the outer jacket 28''' moves in direction of arrow 74''' as the inner jacket 30''' remains generally stationary. The strap 46''' is plastically deformed such that part of the overhead segment of the strap end portion 62''' is moved generally through bend 90 and relocated to lie along inner jacket 30''' with central portion 88, and part of strap central portion 88 is moved through bend 92 and relocated to lie along portion 36''' of the outer jacket 28''' with the overhead segment of the strap end portion 60'''. Responsive to certain sensed conditions relating to driver weight, seat position, whether the driver is belted, and/or vehicle speed, the low load stage of device 44''' is activated and fuse 48''' is fired just prior to the column collapsing, thereby removing pin 72''' from hole 66'''. In the low load stage, only the material comprising the overhead segment of end portion 62''' is deformed and the end portion 60''' stays stationary with inner jacket 30''' without deforming and with respect to centerline 26''' and preferably sliding against the radially inward facing surface of portion 36''' of outer jacket 28'''.

Referring to FIG. 10, a fifth embodiment of the assembly 20'''' is illustrated wherein like components have the same identifying numerals except with the addition of a quadruple prime symbol. An E/A device 44'''' of assembly 20'''' has three or more load stages and preferably three to four load stages. Device 44'''' is similar to that previously described for device 44''' of the third embodiment but having an additional pyrotechnic fuse 96, associated pin 98 and associated layer 100 of a strap 46''''. Fuse 48''' and fuse 96 of device 44'''' are preferably of a common type. Layer 100 of strap 46'''' is similar in shape, structure and function to layer 54'''' of strap 46'''' including the presence of a hole 102 near a distal end 104 for insertion of the releasable pin 98. However, layer 100 is longer than layer 54'''' because both layers preferably engage an inner jacket 30'''' at a common axial location, with layer 56'''' and via bolt 50'''', yet layer 100 extends axially further with respect to a centerline 26'''' because placement of the associated fuse 96 is preferably axially rearward of fuse 48''''.

Those of ordinary skill in the art will now appreciate that the dimensions and material characteristics of strap 46'''' of in E/A device 44'''' may differ considerably from straps 46, 46', 46", 46''', and is designed to match the three-stage or four-stage device's column collapse E/A characteristics to each of three or four different load curves, each stage selected based on sensed driver weight and position, whether belted, and vehicle speed.

For instance and during column 22'''' collapse, in a highest load stage of E/A device 44'''', neither of fuses 48'''' and fuse 96 are fired. For the highest load E/A stage, layers 54'''', 56'''', 100 of strap 46'''' are all placed under stressed and subsequently deformed. In a lowest load stage of E/A device 44'''' both fuses 48'''' and fuse 96 do fire removing respective pins 72'''', 98 from respective holes 66'''', 102 in respective layers 54'''', 100 of strap 46''''. Thus and similar to that previously described in the other embodiments, only the layer 56'''' is stressed and deformed. Yet further, in a third or primary intermediate load stage of E/A device 44'''', only one of fuses 48'''', 96 is fired just prior to column collapse and the other is not fired. Consequently layer 56'''' in addition to either layer 54'''' or layer 100 of strap 46'''' is stressed and deformed. In a fourth or secondary intermediate load stage of E/A device 44'''', only the other one of fuses 48'''', 96 is fired just prior to column collapse.

For example, with reference to FIG. 10, the following four-stage fuse firing logic could be used:

| Load, E/A Characteristic | Fuse 48'''' fired | Fuse 96 fired |
|---|---|---|
| Highest | No | No |
| Primary Intermediate | No | Yes |
| Secondary Intermediate | Yes | No |
| Lowest | Yes | Yes |

Alternatively, the following four-stage fuse firing logic could be used:

| Load, E/A Characteristic | Fuse 48 fired | Fuse 96 fired |
|---|---|---|
| Highest | No | No |
| Primary Intermediate | Yes | No |
| Secondary Intermediate | No | Yes |
| Lowest | Yes | Yes |

It is envisioned that a simpler firing logic could be employed with E/A device 44'''' to accommodate a three-stage load instead of a four-stage load as described above. Such an arrangement would include the above-identified highest and lowest load selections, and only one intermediate selection. For example, the highest load stage, neither of pyrotechnic fuses 48'''', 96 are fired, and all layers 54'''', 56'''', 100 of strap 46'''' are stressed and deformed. In a lowest load stage, both of pyrotechnic fuses 48'''', 96 are fired, and only layer 56'''' of strap 46'''' is stressed and deformed. In the single intermediate or middle load stage, second fuse 96 is fired just prior to column collapse and first fuse 48'''' is not fired, and layers 54'''' and 56'''' are stressed and deformed, but not layer 100, which may freely slide along a channel formed in portion 36'''' of outer jacket 28''''.

For example, with reference to FIG. 10, the following three-stage fuse firing logic may be used:

| Load, E/A Characteristic | Fuse 48'''' fired | Fuse 96 fired |
|---|---|---|
| Highest | No | No |
| Middle | No | Yes |
| Lowest | Yes | Yes |

Alternatively, the following three-stage fuse firing logic could be used:

| Load, E/A Characteristic | Fuse 48'''' fired | Fuse 96 fired |
|---|---|---|
| Highest | No | No |
| Middle | Yes | No |
| Lowest | Yes | Yes |

Although the preferred embodiments of the present invention have been disclosed, various changes and modifications may be made thereto by one skilled in the art without departing from the scope and spirit of the invention as set forth in the appended claims. It is also understood that the terms used herein are merely descriptive, rather than limiting, and that various changes in terminology may be made without departing from the scope and spirit of the invention.

What is claimed:

1. A collapsible steering column assembly for a vehicle comprising:
   a collapsible steering shaft defining a centerline and extending rotatably along the centerline;
   first and second jackets co-extending with and rotatably supporting the steering shaft, wherein the first and second jackets are constructed and arranged to collapse axially with respect to one another;
   an energy absorption device having a strap defining first and second portions with each of the portions attached rigidly to the first jacket and one of the portions attached releasably to the second jacket to define a two stage energy absorption device.

2. The collapsible steering column assembly set forth in claim 1 wherein the energy absorption device includes a fuse attached to the second jacket and a pin projecting operatively outward from the fuse and extending through a hole in the strap for releasably engaging one of the portions of the strap to the second jacket.

3. The collapsible steering column assembly set forth in claim 1 wherein the strap is elongated and extends axially with respect to the centerline.

4. The collapsible steering column assembly set forth in claim 1 wherein the strap is folded over upon itself to define a folded end and the first and second portions with the first portion having a first end and the second portion having a second end.

5. The collapsible steering column assembly set forth in claim 4 wherein the first portion of the strap extends between a third end and the first end and the second portion of the strap extends between a fourth end and the second end with the third and fourth ends defining the folded end.

6. The collapsible steering column assembly set forth in claim 1 wherein the second portion includes at least one laterally projecting tab in contact with a stop carried by the second jacket.

7. The collapsible steering column assembly set forth in claim 1 wherein the second portion is engaged to the second jacket by a threaded bolt.

8. The collapsible steering column assembly set forth in claim 2 wherein the fuse is of a pyrotechnic type.

9. The collapsible steering column assembly set forth in claim 1 wherein the first jacket has an inner tubular portion and the second jacket has an outer tubular portion located radially outward from the inner tubular portion.

10. The collapsible steering column assembly set forth in claim 2 wherein the two stage energy absorption device has high and low load stages of operation with the fuse being constructed and arranged to disengage the pin from at least one of the portions of the strap upon receipt of a given condition to define the low load stage of operation.

11. The collapsible steering column assembly set forth in claim 10 wherein the given condition is at least one of a vehicle speed signal, a driver size signal, a driver position signal, and a seat belt function signal.

12. The collapsible steering column assembly set forth in claim 10 wherein the second portion is substantially co-extending with the first portion and wherein the second portion deforms during both the low and high load stages of operation.

13. The collapsible steering column assembly set forth in claim 10 wherein the strap defines a third portion with one end of the third portion attached rigidly to the first jacket and an opposing end of the third portion extending to a third distal end; and further including a second fuse engaged to the second jacket and a second pin connected operably to the second fuse and releasably to the third distal end.

14. The collapsible steering column assembly set forth in claim 1 wherein the first portion includes a first width and the second portion includes a second width that differs from the first width to further define the two stage energy absorption device.

* * * * *